Dec. 27, 1960 W. LINGNER 2,966,098
UNDERCUTTING MACHINE FOR COMMUTATORS
Filed Aug. 6, 1957 5 Sheets-Sheet 1
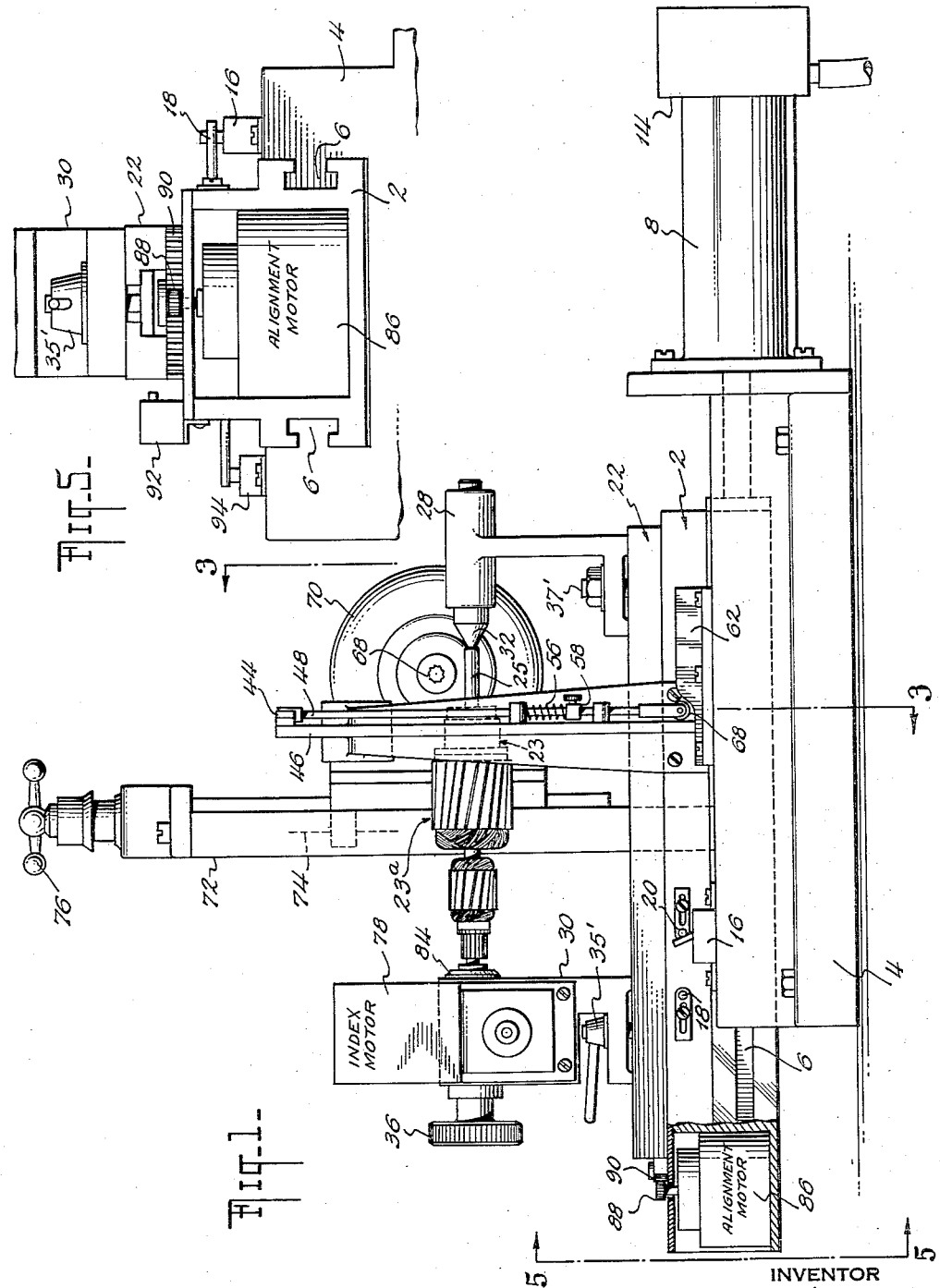
INVENTOR
WILLIAM LINGNER
BY
*Herbert H. Thompson*
ATTORNEY

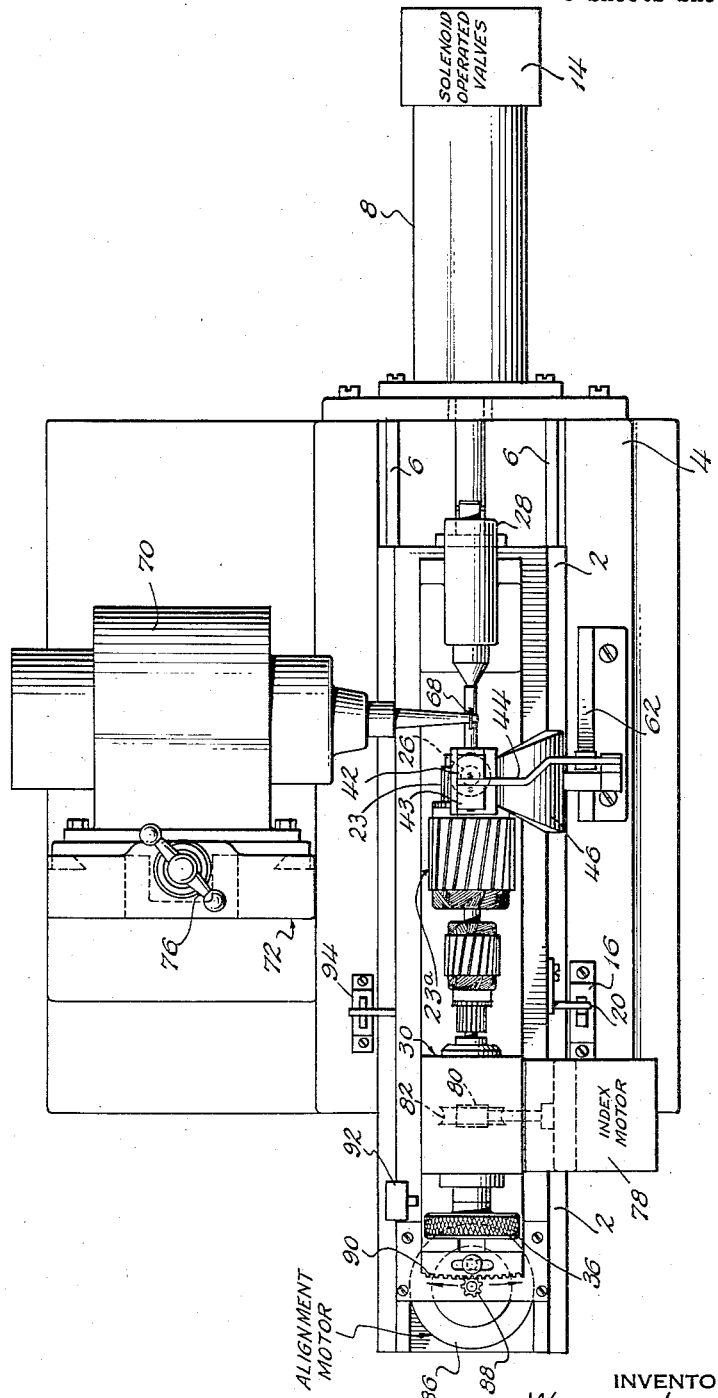

Dec. 27, 1960 W. LINGNER 2,966,098
UNDERCUTTING MACHINE FOR COMMUTATORS
Filed Aug. 6, 1957 5 Sheets-Sheet 3
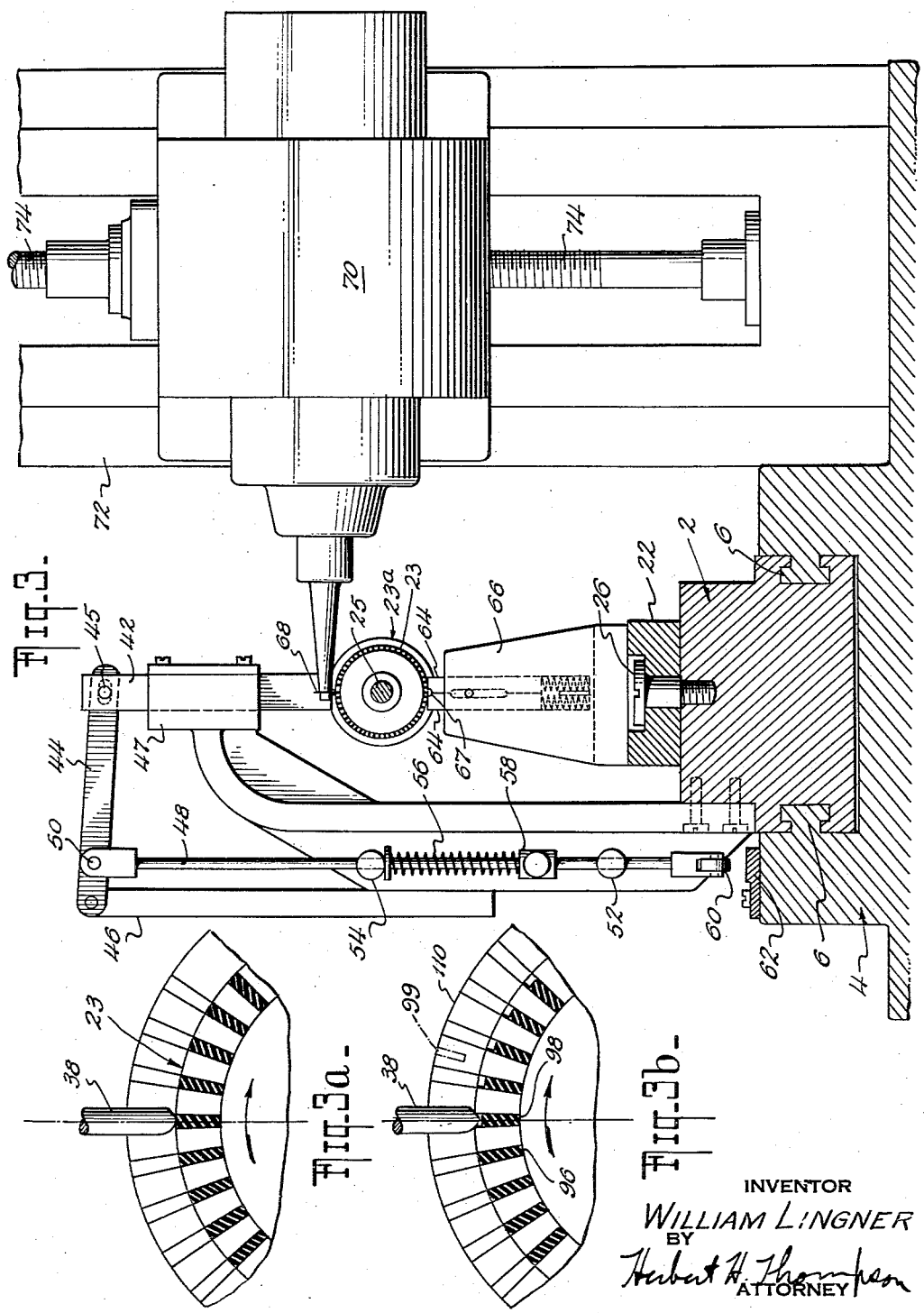
INVENTOR
WILLIAM LINGNER
BY
Herbert H. Thompson
ATTORNEY

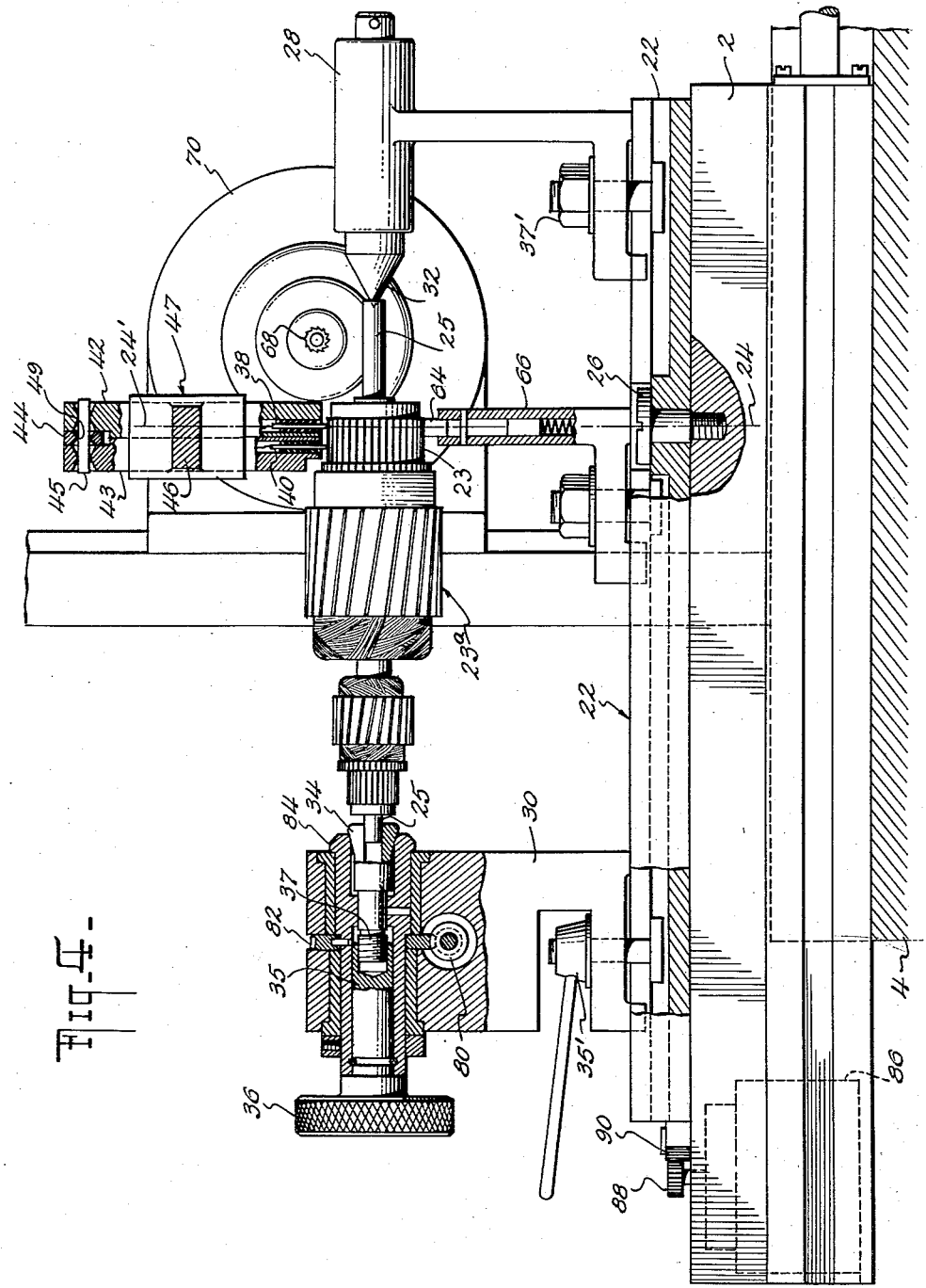

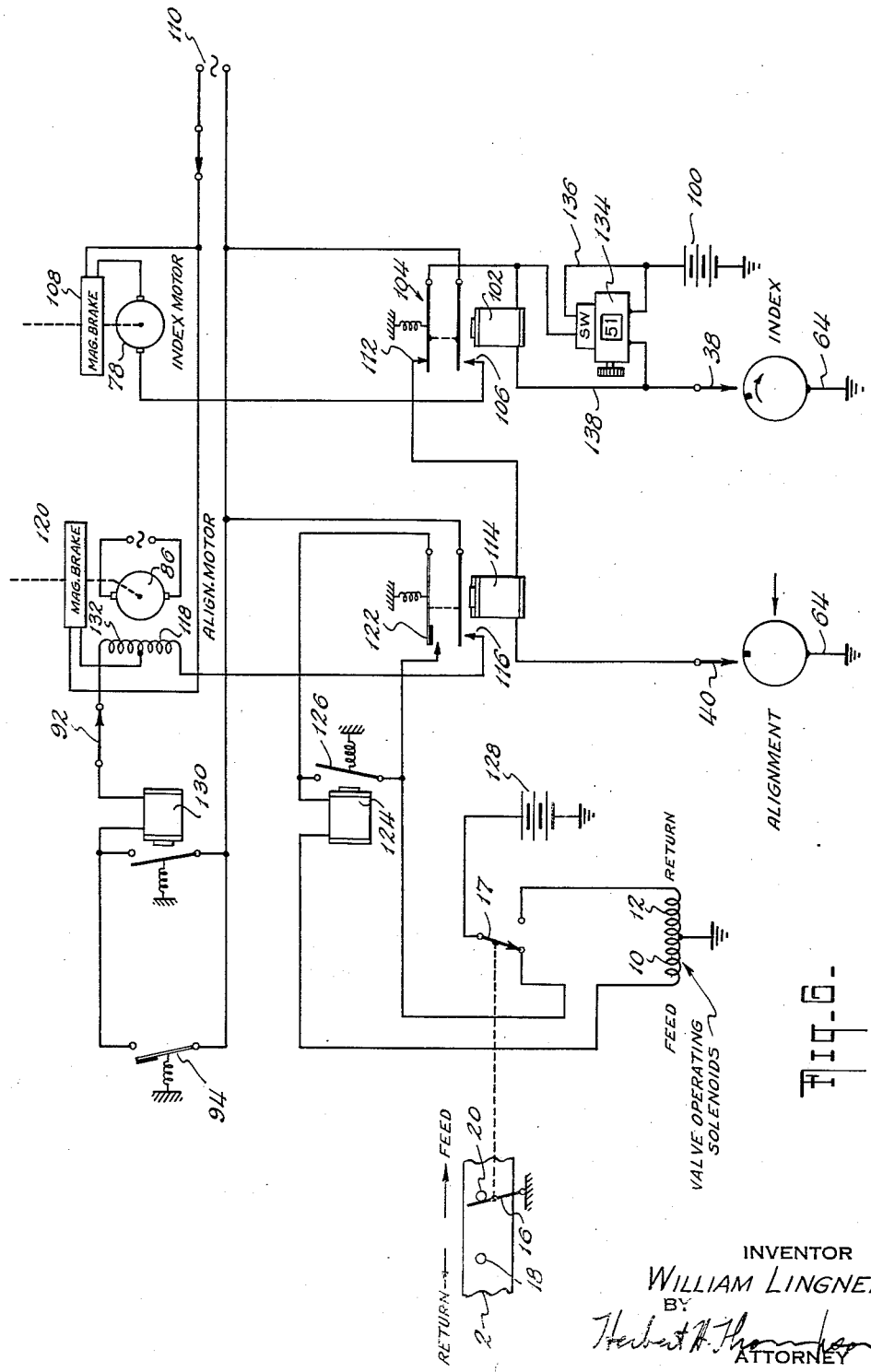

United States Patent Office 2,966,098
Patented Dec. 27, 1960

2,966,098
UNDERCUTTING MACHINE FOR COMMUTATORS

William Lingner, North Bellmore, N.Y., assignor to Sperry Rand Corporation (Sperry Gyroscope Company Division), Great Neck, N.Y., a corporation of Delaware Filed Aug. 6, 1957, Ser. No. 676,573

9 Claims. (Cl. 90—21)

This invention relates to an improved automatic machine for accurately undercutting the mica or other insulation strips between the copper bars or segments of commutators for electric motors or generators. This step is necessary because the copper commutator wears down faster than the mica strips and hence poor brush contact will result after short use unless the mica strips are undercut initially. Such bars and the mica strips should lie in the plane of or parallel with the rotor shaft or axis of rotation of the armature, but unfortunately, when building up such armatures, the strips deviate from such alignment in many cases. Also in practice the width of the commutator segments is not uniform. The normal feed motion of the undercutter is in the direction of the armature axis and hence the cutter will cut away portions of the commutator in case the commutator has not been properly indexed or in case the mica strip is misaligned unless the operator by observing each mica strip before operating the cutter manually indexes the commutator and also readjusts the alignment when necessary so that the feed motion of the carriage will be parallel or aligned with the mica strip rather than with the armature axis. This has proven a slow and tedious process and delays the manufacture of armatures having commutators, if attempted.

According to my invention, I have devised an automatic undercutting machine which accurately aligns the relative feed motion of the carriage and cutter with each mica strip before each undercutting operation so that the cutter exactly follows the mica and does not cut away uneven portions of the adjacent copper segments. In addition, my machine is arranged to automatically index or rotate the commutator after each cutting operation through exactly the width of the next copper bar and strip to bring the next insulating strip under the cutter. After each step is thus effected, the above aligning operation is automatically effected and is then followed by the feeding or cutting operation and the return stroke.

I am aware that undercutting machines have been tried in which the indexing is effected arbitrarily on the assumption that all sections of the commutator are equal and parallel with the armature axis, but in practice such is not the case and my invention is such that the commutator indexing is controlled from a probe or feeler which contacts each segment in turn and causes it to turn in individually measured steps each equal to the measured width of each copper segment and the adjacent mica strip.

There are hence several automatically operated motive means employed in my machine:

(a) The motive means to effect the cutting and return stroke of the carriage;

(b) The indexing or step-by-step motor to bring the mica strips successively under the cutter; and (c) The motor to skew that portion of the carriage (the platform) which carries the armature (or alternatively the cutter) to align each mica strip with the motion of the cutter.

For detecting misalignment, different techniques may be employed within the scope of my invention but I have shown spaced contact probes for this purpose which are normally raised above the armature but are lowered into contact therewith before each cutting operation. Preferably, one of the probes is in alignment with the pivotal axis on the carriage about which the platform is skewed or adjusted so that its position is not affected by such skewing or adjusting while the other probe is spaced therefrom in a direction precisely in the direction of motion of the cutter. By this probe structure, the one probe is used to control the indexing operation and both are used to control the skewing operation. Thus, if both probes contact the insulating strip after indexing, the strip is in parallel alignment with the armature axis and, hence, in the illustrated embodiment, parallel with the carriage or cutter movement and no aligning or skewing adjustment occurs, but if the second probe contacts a copper strip, this strip must not be precisely parallel to the armature axis and the platform is rotated about its skew axis until both probes contact only the adjacent mica strip at which time the adjustment is stopped. The probes are then raised and the cutting cycle started.

Referring to the drawings in which a preferred form of the invention is shown:

Fig. 1 is a side elevation, partly in section, of my improved automatic undercutting machine;

Fig. 2 is a plan view of the same;

Fig. 3 is a vertical section taken on approximately line 3—3 of Fig. 1 but on a larger scale;

Figs. 3a and 3b are enlarged portions of a commutator and a probe, showing the position of the mica before and after undercutting and the position of the indexing probe at the start of an indexing cycle;

Fig. 4 is a side elevation, partly in section, of my machine on a somewhat larger scale than Fig. 1 and showing the independent slidable mounting for each probe;

Fig. 5 is an end elevation taken approximately on line 5—5 of Fig. 1 showing the alignment motor and operating switches; and Fig. 6 is a schematic wiring diagram showing the cycle of operation of the machine and a simplified circuit to control the three motive means for effecting the feeding or cutting and return strokes, the indexing, and the alignment.

In the form of the invention shown, the main carriage 2 supports the armature and is moved with respect to the cutting tool on the feed stroke but obviously it could carry the cutting tool, if desired, with the armature stationary. As shown, the main carriage 2 is slidably mounted and guided on fixed base or bed 4 in trackways 6 and is shown as fed back and forth by a pneumatic or hydraulic servomotor 8 which is controlled in both directions by control solenoids 10 and 12 within control or valve box 14. The stroke of the carriage is controlled by switch 16 secured to bed 4 which is thrown to one position or the other by adjustable stop pins 18 and 20 on the carriage, whereby the length of the stroke may be changed for different length commutators. On said carriage 2 is mounted a platform 22 which is pivoted about a vertical axis 24—24' (Fig. 4) on the carriage 2 so that it may be adjusted slightly for the alignment purpose above described. The pivotal mounting is shown as provided by a pivot pin 26 threaded on carriage 2 and extending through a hole in the platform 22 to provide a vertical bearing.

Mounted on said platform 22 are the usual spaced tailstock 28 and headstock 30 for supporting the armature 23a whose commutator 23 is to be undercut. These supports may be of the usual type used in lathes in which the armature shaft 25 is clamped between tailstock 28 with its dead center 32 and the headstock 30 with its adjustable collet or chuck 34 which is caused to grip one end of the armature shaft as shown by turning the knurled wheel 36 having a sleeve 35 threaded on the shaft 37 of collet 34. Each support 28 and 30 may be adjustably mounted on the platform 22 as by wing nuts 35' and 37' so that different size armatures may be accommodated in the usual manner.

The two probes for testing the alignment of the commutator supports and for automatic indexing are as shown at 38 and 40, see Fig. 4. The former is preferably aligned with the vertical pivotal or skew axis 24—24' of the platform 22 so that it may be used in the indexing operation as described above. The second probe 40 is axially spaced from the first probe and each is independently carried in vertically adjustable blocks or holders 42, 43 independently and pivotally coupled to cross pin 45 carried by said blocks 42, 43 which are vertically slidable in the fixed guide 47 mounted on the bracket 49 secured to the carriage 2 (Fig. 4). Cross pin 45 is clamped at its center in a knife edge bearing 49 in a rocker arm 44 pivoted to fixed bracket 46, which arm is given a limited vertical movement by rod 48, as hereinafter described. Thus, each of the probes may be pressed against the commutator with equal pressure from one spring 56 on rod 48, since the down pressure provided by arm 44 on pivot pin 45 will be equally distributed between the two probes 38 and 40 because of the knife edge bearing 49. A ground contact is provided on the underside of the commutator by spring pressed conducting blocks 64 guided in the mounting 66. Said blocks are cut away slightly at 67 to straddle any high mica strip thereby to assure positive electrical contact.

A limited vertical adjustment of the holders 42, 43 to raise and lower the probes 38 and 40 is provided by the rod 48 pivoted at 50 to arm 44 and vertically slidable in fixed guides 52 and 54 (Figs. 3 and 1). The rod is normally pressed downwardly by spring 56 between the adjustable abutment 58 on the rod and the upper guide 54 so as to normally hold probes in guide 47 against the commutator. When, however, the roller 60 on the end of rod 58 is engaged by the raised portion of the cam block 62 on the machine base 4, the probes are raised well above the commutator and out of the way of the cutting tool during the cutting and return strokes. Toward the end of the return stroke, however, i.e., after the preceding cutting stroke, roller 60 is brought over the low portion of the cam which permits spring 56 to bring the probes down on the commutator.

The cutting tool is shown as a small circular saw or cutting disc 68 on the shaft of the cutter motor 70 mounted on the fixed base 4. Adjustment of the cutter for different size commutators may be effected by mounting the motor for vertical adjustment in vertical trackway 72, adjustment being provided for by threaded shaft 74 operated from the handwheel 76. The indexing motor is illustrated at 78 (Fig. 2) and is shown as having a worm 80 on the shaft thereof turning the worm wheel 82 fixed to the clamping sleeve 84 of the collet 34. Thus, when the indexing motor is rotated, it turns the armature and commutator through the width of the commutator section and insulating strip about to be undercut since the motor is controlled from the probe 38, as hereinafter explained.

The alignment motor 86 is shown as mounted on the carriage 2 and as having a vertical pinion 88 geared to a short gear sector 90 on one end of the platform 22 so that when the motor is rotated it will turn the platform about its vertical axis 24—24' if the particular slot in the commutator is misaligned with the axis thereof, through an angle sufficient to align such slot with the movement of the platform. In the controls for motor 86, is not only the probe 40 but a limit switch 92 which is opened when the platform reaches its maximum skewed adjustment in one direction only. (See Figs. 2 and 5.) While the same result could be obtained by having the commutator shaft 25 normally aligned with the trackway 6 and skewing the platform 22 in one direction or the other as required for alignment, I find it simpler to normally bias or misalign the commutator and platform 22 in one direction through an angle somewhat greater than permissible misalignment of the insulating slots so that the motor 86 is always turned in the same direction for the aligning operation, even though there would otherwise be no misalignment. If the misalignment is in the direction of the initial skewing of the platform, a lesser adjustment is necessary than if there is no misalignment or if a misalignment in the opposite direction is present. Limit switch 16 in cooperation with stops 18 and 20 operate to limit the feeding movement of the carriage to the length of the commutator. I also provide a wiping contact 94 which is temporarily closed as the cutter leaves the end of the commutator to reset the platform in its skewed position.

To follow through a cycle of operation with the aid of the wiring diagram of Fig. 6, the position shown of the switches 16 and 17 and the actuating stops 18 and 20 therefor is that assumed at the end of the return stroke when preparing for the cutting or feed stroke of the commutator 23. Before the feed stroke begins, it is necessary to bring the mica strip 96 beyond the one 98 cut by the preceding cutting stroke, under the cutter (Fig. 3b) (i.e., to index the commutator) and this function is automatically accomplished through the first probe 38, the probes having been lowered as roller 60 moves beyond the high portion of the cam 62 as explained. As shown in Fig. 3b, the probe is preferably somewhat wider than the commutator slots so as to bridge the slot and complete a circuit from a source of power represented at 100 through relay coil 102 to ground through the probe and commutator, and thus draw the armature 104 downwardly to close contact 106 and start the index motor 78 by completing a circuit from source of power 110. The end of the probe is also tapered (Fig. 3a) so that the probe is lifted out of contact with the copper as soon as the commutator has been turned far enough so that the probe engages the next uncut mica strip, whereby to deenergize relay 102 and to stop the index motor 78. Said motor may be equipped with the usual form of magnetic brake 108 to bring the same quickly to rest.

Upper contact 112 of relay 104 will then be closed to excite relay coil 114 because the second probe 40 will touch the next copper commutator section because of the initial setting of the alignment carriage in its full one-way skewed position. A circuit will, therefore, be completed through the commutator to excite relay coil 114 and close lower contact 116, thus exciting one winding 118 of motor 86 to drive the same in a direction to move it away from limit switch 92. As soon, however, as the circuit is broken at probe 40, switch 116 opens and stops the motor which may likewise be equipped with a magnetic brake 120. At the same time, the second contact 122 of relay 114, which is in the form of a one-way wiping contact, is momentarily closed as it is raised to energize the holding magnet 124 to close the switch 126 and complete a circuit from the source of power 128 through switch 17 and the feed coil 10.

After the cycle of indexing and alignment (as described), the cutting stroke is then made and the return stroke of the carriage follows, but when the cutter reaches the end of the commutator slot a second one-way wiping contact 94 in the carriage base is momentarily closed to excite the holding magnet 130 to complete a circuit through the reverse field winding 132 of motor 86 to actuate the alignment motor 86 and rotate the platform 22 until the limit switch 92 is again open, i.e., until the skewed platform 22 is reset. In this position, the platform has been rotated beyond the maximum variation in the slot alignment which is permitted so that the motor 86 is always started up in the same direction but its movement stopped when misalignment in either direction has been compensated for.

Variations and additional refinements may, of course, be provided within the scope of my invention. Thus, an indexing counter 134 may be placed across leads 136, 138 to show the number of segments on the commutator as they are undercut and which preferably operates in a known manner to halt the cycle as soon as the last mica strip has been undercut.

With slight modification, my invention could also be used to slot the conducting segments in the riser of the commutator beyond the brushes for reception of the leads from the armature winding. Such slots 99 are usually placed in the middle of each conducting segment in the riser 110 of the commutator, as shown in Fig. 3b, and readily be cut by applicant's cutter 68, following the same procedure outlined for undercutting the mica strips by using applicant's main probe 38 to actuate his indexing motor 78 and probe 40 for alignment. By this means each slot is cut midway between the mica strips and not irregularly, as is the case where they are cut arbitrarily without allowance for the irregularity of the mica strips.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A commutator undercutting machine, a mount for supporting the commutator for rotation about its axis of symmetry, a mount for the cutter, said mounts being relatively fed in a direction bearing a predetermined relationship to said axis, means for rotating the commutator step-by-step about said axis to bring the cutter over each insulating strip of said commutator in turn, electrical means for detecting axial misalignment between each strip and the direction of said undercutting, and means including means operated by said detecting means for angularly positioning said commutator axis with respect to said direction of feed whereby to align each strip with said direction of feed.

2. In a commutator undercutting machine, a base, a feed carriage slidably mounted thereon for feeding in one direction, a second carriage rotatably mounted on said first carriage adjustable about an axis normal to said feed direction, means for mounting a commutator on said second carriage with its axis of symmetry generally parallel to said feed direction whereby each insulating strip thereof lies generally parallel with said feed direction, means for detecting misalignment between each strip and said feed direction, and means operated thereby for adjusting said second carriage about said first axis whereby to eliminate said misalignment.

3. In a commutator undercutting machine, a carriage for mounting the commutator with its axis of symmetry substantially parallel with a feed axis, means for varying the angular relation between said commutator axis and the said feed axis to compensate for commutator sections which may not be precisely parallel with said feed direction, said last-mentioned means including electrical means for detecting misalignment between each section and the feed axis, and a motor controlled thereby for adjusting said means for varying the angular relationship between the commutator axis and the feed axis to align each commutator section with said feed axis.

4. In a commutator undercutting machine, motive means for successively axially feeding and returning the commutator relative to a cutter at each insulating sector, motive means for indexing the commutator prior to the beginning of each feed stroke, means for detecting any axial misalignment between each conducting bar of said commutator and the direction of the feed stroke prior to the beginning of each feed stroke, and motive means also brought into action prior to each feed stroke for rotatably adjusting said commutator about an axis normal ot said feed direction for correcting said misalignment.

5. A commutator undercutting machine, a mount for the commutator adapted to be skewed relative to the direction of feed thereof relative to the cutter, means for skewing said mount prior to each cutting stroke through an angle in one direction greater than any normal angular misalignment between each insulating strip of the commutator and the direction of feed, means for detecting any such misalignment, and means operated thereby for skewing said mount in the opposite direction from said initial skew angle until alignment between said strip and the direction of feed occurs.

6. A commutator undercutting machine, a mount for the commutator for rotatably supporting the same about its axis of symmetry, means for normally feeding the same in a direction bearing a predetermined relationship to said axis, means for pivotally supporting said mount for adjustment about an axis normal to said direction of feed, a pair of spaced probes adapted to contact each insulating strip of said commutator prior to operation of said feed means, one of said probes being substantially coaxial with said pivotal axis, means controlled by said last named probe for indexing each insulating strip of the commutator, means controlled by the other probe for detecting misalignment between each insulating strip and said directional feed, and means operated by said last named means for adjusting said mount about said pivotal axis until the strip is aligned with said direction of feed.

7. A commutator undercutting machine as claimed in claim 6, wherein said indexing probe is slightly wider than the insulating strips so as to contact the copper after undercutting.

8. A commutator undercutting machine as claimed in claim 7, wherein the engaging end of said indexing probe is tapered so that it is lifted out of contact with the copper when the probe engages the next uncut insulating sector.

9. A machine for undercutting the insulation between the conducting strips of a commutator comprising, a mount for supporting said commutator for rotation about its axis of symmetry, a cutting tool, means for relatively feeding said commutator and tool in a direction normally parallel to the axis of symmetry of said commutator, means for pivotally supporting said mount for adjustment about an axis normal to said feed direction, means for detecting misalignment between said insulation and said direction of feed, and means controlled by said detecting means for adjusting said mount about said pivotal axis whereby to position said commutator with respect to said feed axis such that said insulation is aligned with said direction of feed.

References Cited in the file of this patent

UNITED STATES PATENTS

| | | |
|---|---|---|
| 2,180,771 | Poole | Nov. 21, 1939 |
| 2,432,058 | Wiken | Dec. 2, 1947 |
| 2,660,838 | Green | Dec. 1, 1953 |
| 2,718,177 | Karmann | Sept. 20, 1955 |